United States Patent [19]

Polito et al.

[11] Patent Number: 5,146,777

[45] Date of Patent: Sep. 15, 1992

[54] DEVICE FOR DETECTING PINKING, CYLINDER BY CYLINDER, IN A MULTI-CYLINDER OTTO ENGINE

[75] Inventors: Gino Polito, Voghera; Franco Maloberti, Torre D'Isola; Franco Salerno, Alpignano, all of Italy

[73] Assignee: Marelli Autronica SpA, Milan, Italy

[21] Appl. No.: 592,401

[22] Filed: Oct. 3, 1990

[30] Foreign Application Priority Data

Oct. 3, 1989 [IT] Italy ............................ 67846 A/89

[51] Int. Cl.$^5$ ............................................ G01L 23/22
[52] U.S. Cl. ....................................................... 73/35
[58] Field of Search ........................... 73/35; 123/425

[56] References Cited

U.S. PATENT DOCUMENTS

| | | | |
|---|---|---|---|
| 4,354,378 | 10/1982 | Oshiage | 73/35 |
| 4,364,260 | 12/1982 | Chen et al. | 73/35 |
| 4,593,553 | 6/1986 | Bonitz et al. | 73/35 |
| 4,943,776 | 7/1990 | Polito et al. | 73/35 |

Primary Examiner—John E. Chapman
Attorney, Agent, or Firm—Sughrue, Mion, Zinn, Macpeak & Seas

[57] ABSTRACT

The device includes two channels for detecting and processing the signal provided by an accelerometric sensor, operating in two frequency bands in which peaks indicative of pinking (knocking) may occur. In each combustion phase, a third channel, also connected to the sensor, provides a signal representative of the noise component of the signal from the sensor, in a frequency band in which the peaks do not occur. The signals provided by the first and second channels are integrated and then compared with a reference signal generated in dependence on the noise component detected cylinder by cylinder. The device thus enables pinking to be detected cylinder by cylinder.

6 Claims, 1 Drawing Sheet

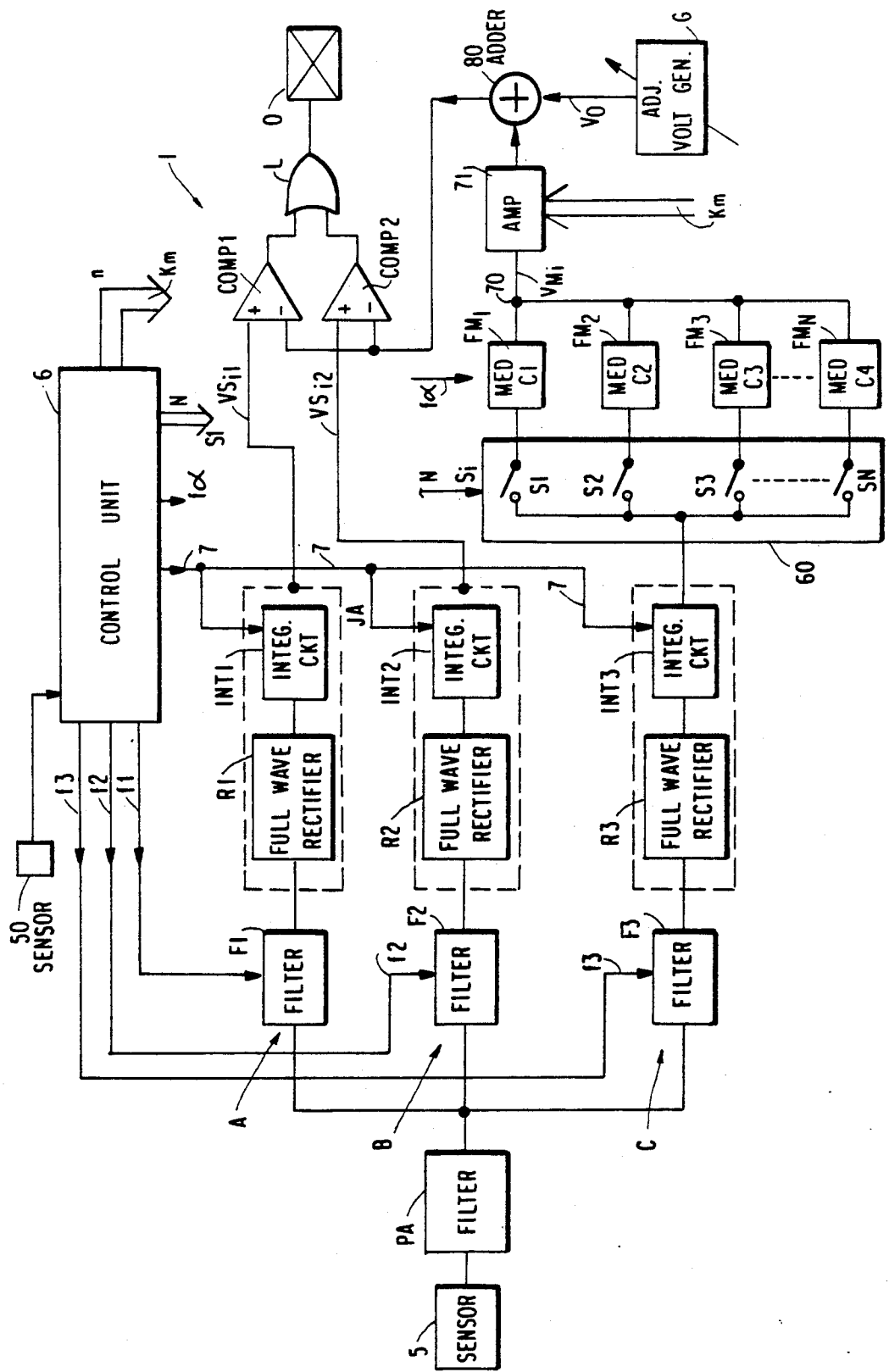

DEVICE FOR DETECTING PINKING, CYLINDER BY CYLINDER, IN A MULTI-CYLINDER OTTO ENGINE

BACKGROUND OF THE INVENTION

The present invention relates in general to the problem of detecting pinking (knocking) in internal combustion engines, particularly with regard to controlled-ignition (Otto) engines for motor vehicles. As is known, pinking occurs in these engines due to the self-ignition of the explosive mixture for various reasons (excess fuel supply, a high compression ratio, certain load conditions, etc.) when the piston is near top dead centre (TDC).

Pinking does not cause substantial variations in the form of the pressure cycle between the compression, combustion and expansion phases of the engine but gives rise to oscillations which are superposed on the normal cycle at its peak.

The frequencies of the oscillations are determined by the dimensions of the combustion chamber and its temperature when the pinking occurs. The typical resonance frequencies of these oscillations can be calculated theoretically with a good approximation, as explained, for example, in U.S. Pat. No. 4,943,776. Since the temperature of the fluid in the cylinders generally increases with increases in the rate of rotation (revs/minute) of the engine, the resonance frequencies may become higher as the rate of rotation increases.

The pressure oscillations generated when pinking occurs are propagated through the walls of the cylinder and can be detected by a sensor. The sensor also detects vibrations due to normal combustion, however, and those due to the moving mechanical members. The signal output by the sensor must therefore be manipulated in order to separate the useful signal attributable to pinking from the background noise which may vary in dependence on the rate of rotation (revs./minute) of the engine and on the extent of wear.

More specifically, pinking can be detected by means of a pressure sensor facing the combustion chamber or by means of an accelerometric sensor, particularly a piezoelectric sensor, on the engine block. The latter type of sensor is usually preferred for reasons of cost and reliability.

In order to detect pinking, the accelerometric sensor is mounted on the engine block, typically on the head or near the inlet manifold.

The signal provided by such a sensor thus includes a noise component and a useful signal component (that is, a component actually linked to the pinking) whose spectrum may have peaks indicative of pinking in a plurality of frequency ranges. Thus, for example, for a cylinder having a diameter (bore) of approximately 80 mm, peaks may be detected substantially at frequencies of 8, 13.8, 15.8 and 18.2 KHz.

The key factor for the correct detection of pinking, therefore, is the establishment of a criterion which enables the useful signal to be separated from the noise component of the signal output by the sensor.

Various devices have thus been proposed and these are analysed and criticised in detail in the introduction to U.S. Pat. No. 4,943,776 cited above.

An improved performance can be achieved by the device which forms the specific subject of that U.S. patent.

The device according to U.S. Pat. No. 4,943,776 achieves a better signal/noise ratio than prior devices by virtue of a channel which evaluates the characteristics of the background noise in a region of the spectrum which is relatively insensitive to pinking. The pinking detection strategy of this device is greatly simplified, however, and presupposes a well-defined and deterministic knowledge of the signal provided by the accelerometric sensor. Moreover, the device does not lend itself to the detection of pinking cylinder by cylinder since the reference signal with which the signal resulting from the processing of the signals in the first two channels is compared represents the average noise of all the cylinders and not that relating to each individual cylinder.

Finally, in the prior device, the strategy for the comparison between the signals processed by the first two channels and the signal processed by the third was quite complex and provided for a preliminary comparison between the signals processed by the first two channels.

SUMMARY OF THE INVENTION

According to the present invention, these limitations and disadvantages of the prior device of U.S. Pat. No. 4,943,776 are overcome by means of a device for detecting pinking in a multi-cylinder Otto engine, comprising a sensor which is intended to be associated with the engine for generating a signal with a noise component and a useful signal component whose spectrum have peaks indicative of pinking in a plurality of frequency ranges, at least first and second signal-processing channels connected to the sensor, for each combustion phase of the engine, to supply respective first and second detection signals representative of the useful signal component in first and second frequency ranges respectively; a third signal-processing channel also connected to the sensor, in each combustion phase of the engine, to supply a third detection signal representative of the noise component in a frequency band different from the aforesaid frequency ranges; comparison and processing means arranged to generate a signal indicative of pinking on the basis of comparisons carried out on data derived from the first, second and third detection signals; multiplexer means having an input connected to the output of the third channel and a plurality of outputs, each of which is associated with a corresponding cylinder of the engine, the multiplexer means, in each combustion phase, providing a sample of the third detection signal at its output associated with the cylinder which is in the combustion phase; a respective filter and memory device being connected to each output of the multiplexer means for supplying to the comparison and processing means an averaged signal indicative of a weighted average of at least those samples of the third detection signal received lastly and penultimately, the comparison and processing means being arranged, in each combustion phase, to generate the signal indicative of pinking on the basis of comparisons carried out on the first and second detection signals and the averaged signals supplied by the filter and memory devices.

BRIEF DESCRIPTION OF THE DRAWINGS

Further characteristics and advantages of the invention will become clear from the detailed description which follows with reference to the appended drawing which shows the structure of a device according to the invention in the form of a block diagram.

DETAILED DESCRIPTION OF THE INVENTION

In the drawing, a device according to the invention is generally indicated 1 and comprises an accelerometric sensor S for detecting pinking (knocking) in an Otto engine, not shown. The sensor S is of known type.

A filter (PA) is connected to the sensor S and is intended to attenuate the components of the frequency signal lower than the lowest of the resonance frequencies associated with pinking.

The output of the filter (PA), which may be the high-pass or band-pass type, is connected to three signal-processing channels, generally indicated A, B and C respectively. These channels include respective filters F1, F2 and F3 whose outputs are connected to respective full-wave rectifiers R1, R2 and R3. The outputs of the rectifiers are connected in order to the inputs of corresponding integrator circuits INT1, INT2 and INT3.

The integrators are enabled periodically in synchronism with the rotation of the engine by a control unit 6 (typically a microprocessor) which generates a corresponding signal on a control line 7. Each time the synchronisation signal is applied to the line, it enables the integrators for a time interval corresponding to an observation or detection window so as to create a "listening" window around TDC in the combustion phase.

The microprocessor 6 also controls the tuning frequencies of the (band-pass) filters F1, F2, by means of digital signals sent on respective lines f1 and f2. In particular, the microprocessor can be arranged to vary these frequencies so as to take account of the changes in the resonance frequencies caused by variations in the rate of rotation of the engine.

The microprocessor 6 controls the tuning frequency of the filter F3 by means of a line f3. This filter is tuned to a frequency different from the resonance frequency, in a frequency range which is significant as regards the background noise picked up by the sensor. If the frequencies f1 and f2 correspond to the first two resonance peaks, the frequency f3 is, for example, a frequency intermediate f1 and f2.

The band widths of the filters F1, F2 and F3 are, for example, approximately 2 KHz.

The signal applied by the microprocessor 6 to the line 7 in each combustion phase is such as to enable the integrators INT1-3 to operate for time periods corresponding, for example, to an angular window t=70° starting from TDC. The moments at which the various cylinders pass through TDC and the rate of rotation of the engine are detected by the microprocessor 6 on the basis of data supplied to it by a sensor 50 of known type.

The outputs of the integrators INT1 and INT2 are connected to the non-inverting inputs of respective threshold comparators COMP1 and COMP2 whose outputs are connected, in the embodiment illustrated, to two inputs of an OR-type logic circuit.

The output of the integrator INT3 is connected to the input of a multiplexer 60 having a plurality of outputs (four in the embodiment illustrated in the drawing), each of which is associated with a corresponding cylinder of the engine. The multiplexer 60 may be considered as a set of N switches $s_1$-$s_N$ each of which is interposed between the input and a respective output of the multiplexer. These switches are controlled by the microprocessor 6 through N lines indicated $S_i$, in the manner which will be explained below.

The outputs of the multiplexer 60 are connected in order to respective filter and memory devices $FM_1$-$FM_N$ the outputs of which converge at a node 70 connected to the input of the amplifier 71 whose gain $K_m$ can be varied by the microprocessor 6 in a programmed manner by means of signals applied to a set of lines also indicated $K_m$.

In operation, the microprocessor 6 controls the multiplexer 60 so as cyclically to connect only one filter and memory device FM at a time, that is, in each combustion phase, to the noise-component integrator INT3. In particular, in each combustion phase, the device FM associated with the cylinder in which combustion takes place is connected to the integrator INT3.

Each filter and memory device FM is arranged to output averaged signal indicative of a weighted average of (at least) the last and penultimate signal samples transmitted to it by the integrator INT3 through the multiplexer 60. This averaged signal may be constituted, for example, by a combination in which 1/10 of the last sample received is added to 9/10 of the value averaged previously.

The filter and memory devices FM (which may be formed integrally by means of CMOS-type devices with switched capacitance) are piloted through a line f by the microprocessor 6 which enables them cyclically, each immediately before the end of the integration window during which the integrators INT1-INT3 are enabled.

Each of the devices FM therefore outputs an averaged signal indicative of an average background noise relating to the corresponding cylinder, and the average is updated cyclically for each N operating cycles of the engine during the integration window relating to the TDC of the associated cylinder.

Each device FM has memory capacity so that it can store the updated value during each active stage and make it available during the next active stage-relating to the same cylinder.

The memory capacity may be formed, for example, with the use of a capacitor.

The sequence of averaged signals present at the node 70 is amplified by a gain factor $K_m$ which the processor 6 varies in a predetermined manner (that is, for example, according to a stored table) in dependence on the rate of rotation of the engine still detected, for example, by the sensor 50. The signal output by the amplifier 71 reaches the inverting inputs of the comparators COMP1 and COMP2 after its average level has been raised by the addition thereto of an offset voltage $V_O$ provided by an adjustable voltage generator G. This offset contributes to the determination of the switching thresholds of the comparators and in fact enables the sensitivity of the device to be adjusted.

In operation, as soon as one of the comparators COMP1 or COMP2 detects that the signal supplied to it by the integrator to which it is connected exceeds the threshold signal supplied to it by the adder 80, the output 0 of the logic circuit L outputs a signal at logic level "1" which is indicative of pinking. In an electronic ignition system, this signal can be used for correcting the advance so as to prevent pinking.

To summarise the foregoing explanation, the device described above generates a signal indicative of pinking when:

$$\max\{V_{Si1}, V_{Si2}\} - K_m V_{Mi} > V_0$$

where the subscript i refers to the i-th cylinder which is in the combustion phase during the integration window under consideration;

$V_{Si1}$ is the signal output by the integrator INT1 with the filter F1 tuned to a first resonance frequency f1 during the integration period relating to the combustion in the i-th cylinder;

$V_{Si2}$ is the signal output by the integrator INT2 with the filter F2 tuned to a second resonance frequency f2 during the integration period relating to the combustion in the i-th cylinder;

$V_{Mi}$ is the average of the samples taken at the output of the integrator INT3 with the filter F3 tuned to a frequency intermediate f1 and f2 near the end of the integration period relating to the combustion phase in the i-th cylinder, $K_m$ is the amplification factor of the amplifier 71, the value of which can be varied by the microprocessor 6 in a programmed manner in dependence on the rate of rotation of the engine, and $V_0$ is the offset voltage which can be adjusted when the device is calibrated and which enables the sensitivity of the pinking detection to be varied.

We claim:

1. A device for detecting pinking in a multi-cylinder Otto engine, comprising:

a sensor which is intended to be associated with the engine for generating a signal with a noise component and a useful signal component whose spectrum has peaks indicative of pinking in a plurality of frequency ranges;

at least first and second signal-processing channels connected to the sensor, for each combustion phase of the engine, to supply respective first and second detection signals representative of the useful signal component in first and second frequency ranges respectively;

a third signal-processing channel also connected to the sensor, in each combustion phase of the engine, to supply a third detection signal representative of the noise component in a frequency band different from the aforesaid frequency ranges;

comparison and processing means arranged to generate a signal indicative of pinking on the basis of comparisons carried out on data derived from the first, second and third detection signals;

multiplexer means having an input connected to the output of the third channel and a plurality of outputs, each of which is associated with a corresponding cylinder of the engine, the multiplexer means, in each combustion phase, providing a sample of the third detection signal at its output associated with the cylinder which is in the combustion phase;

a respective filter and memory device being connected to each output of the multiplexer means for supplying to the comparison and processing means an averaged signal indicative of a weighted average of at least those samples of the third detection signal received lastly and penultimately, the comparison and processing means being arranged, in each combustion phase, to generate the signal indicative of pinking on the basis of comparisons carried out on the first and second detection signals and the averaged signals supplied by the filter and memory devices;

wherein each of the signal-processing channels includes respective input band-pass filter and a rectifier connected in cascade, and each of the channels downstream of the respective rectifier includes a respective integrator, the output of the integrator of the third channel being connected to the input of the multiplexer means, and wherein comparison and processing means are arranged to output a signal indicative of pinking during a combustion phase of a cylinder, when the signal provided by the integrator of either the first or second channel exceeds a reference signal which depends on the averaged signal corresponding to that cylinder.

2. A device according to claim 1, wherein the comparison and processing means include an amplifier connected to the outputs of the filter and memory devices to multiply the averaged signals by a predetermined scale factor.

3. A device according to claim 2, wherein the amplifier is of the scale-factor or programmable-gain type and means are provided for modifying the value of the scale factor or gain in a predetermined manner in dependence on the rate of rotation of the engine.

4. A device according to claim 2, wherein the comparison and processing means include an adder for adding to the signal output by the amplifier an offset voltage which can be varied at the calibration stage, the signal output by the adder constituting the reference signal for the comparison and processing means.

5. A device according to claim 4, wherein the comparison and processing means include at least first and second threshold comparators having respective first inputs connected to the outputs of the integrators of the first and second channels respectively and respective second inputs connected to the output of the adder.

6. A device according to claim 1, also including a high-pass or band-pass filter interposed between the sensor and the first, second and third channels to attenuate the components of the signal from the sensor having a frequency lower than the lowest of the frequency ranges.

* * * * *